DATA PROCESSING EQUIPMENT

Filed Feb. 2, 1960 2 Sheets-Sheet 1

Inventor
E.P.G. WRIGHT-A.D. MARR
By [signature]
Attorney

DATA PROCESSING EQUIPMENT

Filed Feb. 2, 1960 2 Sheets-Sheet 2

Inventor
E.P.G.WRIGHT-A.D.MARR
By [signature]
Attorney

United States Patent Office 3,226,681
Patented Dec. 28, 1965

3,226,681
DATA PROCESSING EQUIPMENT

Esmond Philip Goodwin Wright and Alan Douglas Marr, London, England, assignors to International Standard Electric Corporation, New York, N.Y.

Filed Feb. 2, 1960, Ser. No. 6,256
Claims priority, application Great Britain, Feb. 13, 1959, 5,112/59
4 Claims. (Cl. 340—172.5)

This invention relates to electrical data processing equipment.

According to the invention, electrical data processing equipment includes a data storage device comprising a plurality of storage elements associated in groups each consisting of two or more elements, first scanning means arranged successively to examine complete single groups of storage elements and to determine whether or not any one or more of the elements within a group stores data on which a processing operation is to be performed, and second scanning means arranged to examine successively the individual storage elements of any one group to give access to data stored therein, the operation of the second scanning means being prevented unless the examination of any one group by the first scanning means indicates the presence within the group of required data to which the operation of the first scanning means does not give individual access, and the operation of the first scanning means being prevented during the operation of the second scanning means.

The equipment is preferably arranged so that the examination of any group of storage elements by the first scanning means also provides access to data stored in one pre-determined element of the group.

The invention is particularly suitable for the rapid examination of an intermediate storage device in which incoming data is temporarily stored before being entered in a main storage device. Thus according to another preferred feature of the invention, the equipment includes also a second storage device providing the same number of storage addresses as there are storage elements in the first-mentioned storage device, and access means arranged to be controlled in synchronism with the first and second scanning means whereby data stored in any element of the first storage device to which access is at any instance afforded can be caused to modify data stored in the corresponding addresses of the second storage device.

Figures 1, 3:
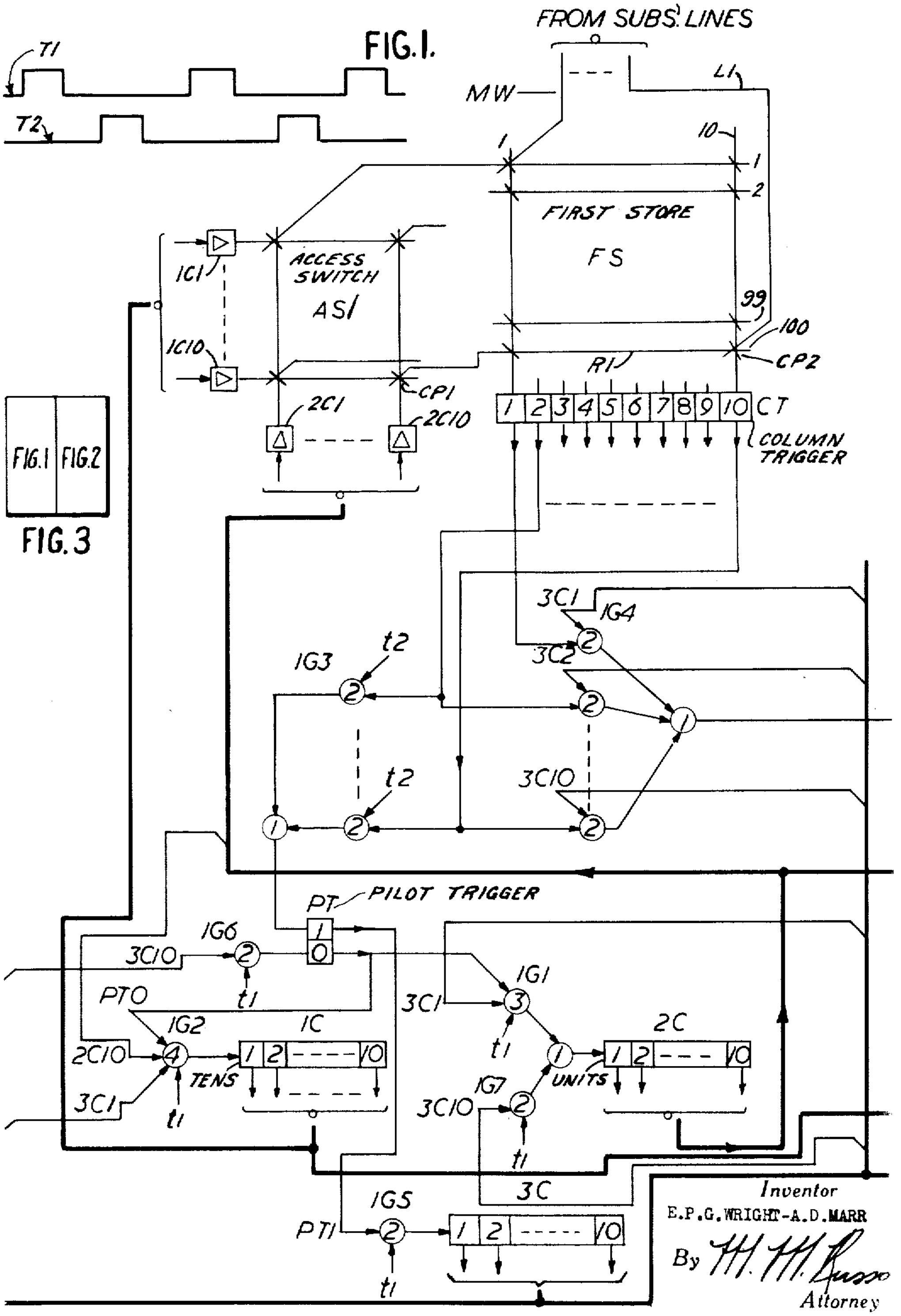
Figure 2:
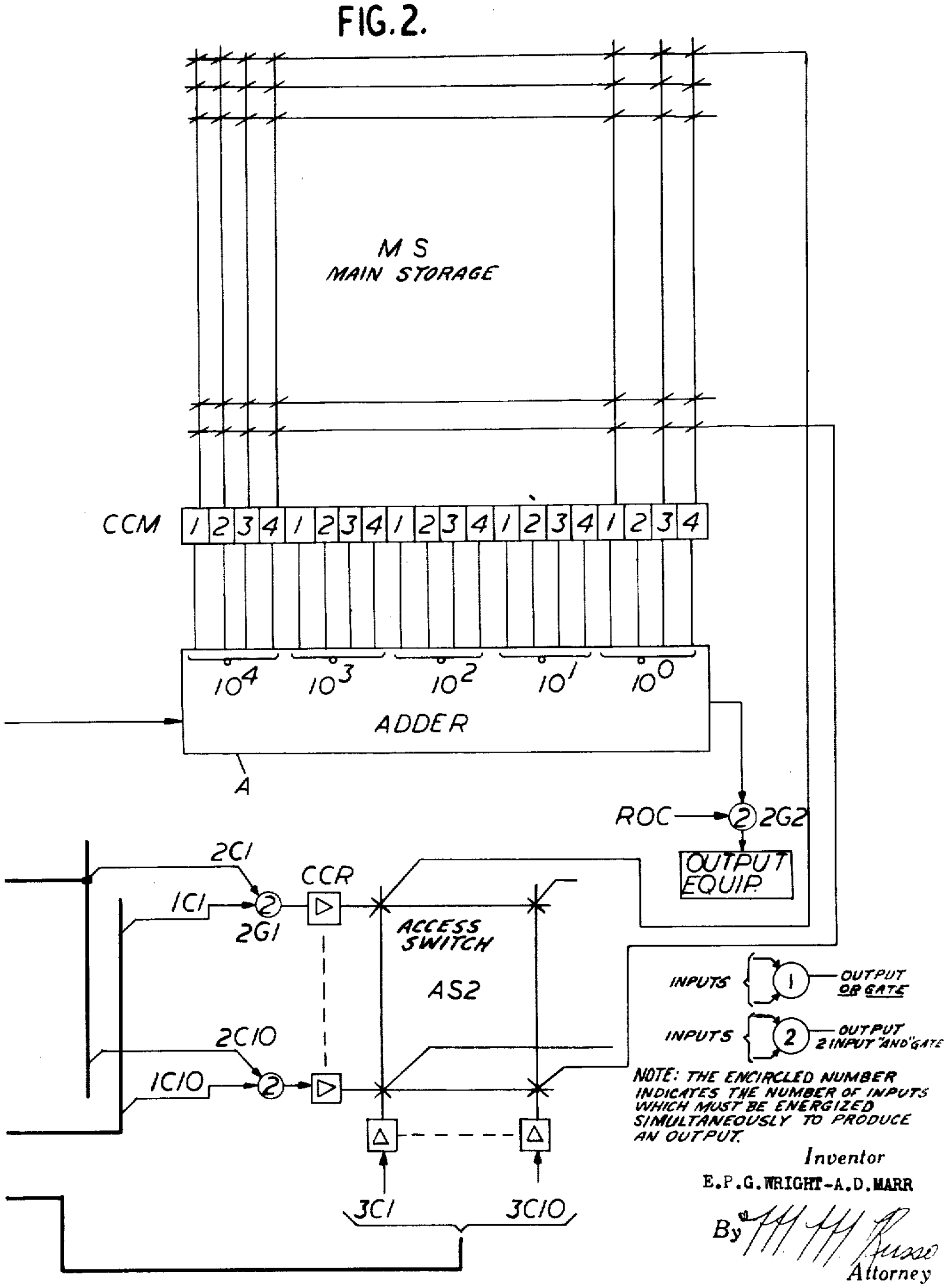

One preferred embodiment of the invention consists in a telephone subscriber's call metering equipment, comprising data processing equipment as hereinbefore defined in which means associated with each individual subscriber's line enters an impulse in the corresponding element of the intermediate store in response to the occurrence of an event to be recorded with respect to that subscriber's line. The features of the invention hereinbefore recited, together with other preferred features, will be evident in the following description of such a telephone subscriber's metering equipment. The description refers to the accompanying drawings which show the equipment in simplified diagrammatic form. The two figures of the drawings together form a composite diagram of the complete equipment, being correctly read when FIG. 2 is placed to the right of FIG. 1. FIG. 3 shows how FIGS. 1 and 2 should be joined.

Various gate circuits are shown in the drawings by circles enclosing a number which indicates how many inputs must be energized simultaneously to provide an output. Thus, an encircled "1" indicates an OR gate where an output occurs responsive to energization of any one input. An encircled "2" indicates a two input AND gate where two inputs must be energized simultaneously to produce an output signal. In like manner, the symbol of an encircled "3" or "4" indicates three or four input AND gates respectively.

In this equipment, meter pulses for timing or charging the calls made by subscribers are initially stored in a co-ordinate matrix FS of "square-loop" magnetic cores. (The term "core" in the present specification refers either to an individual toroid of a "square-loop" ferro-magnetic material, or to the material surrounding a hole in a plate or a block of such a material.) Each subscriber's line served by the equipment is allocated one of the cores, a winding of a subscriber's core in the matrix being connected to his line circuit in such a way that a meter pulse occurring as a result of a call reverses the remanent magnetic state of the subscriber's core. The line matrix FS can of course store only a single meter pulse for each connected line.

The matrix consists of 100 rows, each of 10 cores, the rows of the matrix being selected sequentially for examination by an access switch AS1. For each column of 100 cores there is provided a column circuit including an amplifier and a trigger: the 10 column triggers are indicated at CT in FIG. 1. When a row of cores is selected by the access switch AS1 for examination, any core in the row which at that time is storing a meter pulse sets its corresponding trigger CT. Thus the column triggers indicate which of a batch of 10 lines have meter pulses to be added to their stored totals. For example, assume that line L1 is energized to indicate the presence of a meter pulse. Also assume that each of the ring counters 1C and 2C is standing on its tenth step. Therefore, amplifiers 1C10 and 2C10 conduct. There is a coincidence at crosspoint CP1 so that the row R1 is energized in the first storage matrix FS. Since line L1 is energized, there is coincidence at crosspoint CP2 which causes an energization of the input of column trigger circuit CT10.

The storage device in which the individual subscriber's totals are stored is a second co-ordinate matrix MS (FIG. 2) of "square-loop" ferro-magnetic cores, having 1000 rows. Each row is allocated to a single subscriber and stores that subscriber's meter pulse total. The data stored in a subscriber's row of this matrix is referred to as that subscriber's word.

Associated with the column triggers CT of the subscriber's line matrix FS is a detection circuit which detects whether there is any meter pulse to be dealt with in the group of 10 lines whose state at that particular instant has been read into the column triggers. For example, under the above assumption where line L1 and row R1 are energized, block 10 of column trigger circuits CT conducts when the meter pulse is detected. At the same instant, the meter pulse total for the first line of this group is read out of the main store MS and entered in the adder A. Subsequent action depends on the presence or absence of incoming meter pulses for the lines of the group, as represented by the setting of the column triggers CT.

If there is no incoming meter pulse for any line of the group, the first line total is returned to the main store and the reading process continues with the next group of lines, the next row of the line store FS being read out into the column triggers CT. If the first column trigger CT1 only is set to indicate the presence of a pulse, the same process is followed except in that the first line total is increased by one before being returned to the main store, thus transferring the meter pulse from the line store to the main store.

If any one of the column triggers other than the first has been set, i.e., if one or more of lines 2–10 of the group has a meter pulse to be recorded, then the detection circuit mentioned in the preceding paragraph responds. This response causes the column triggers CT1–CT10 to be scanned and, in synchronism with this scanning, the rows of the data word matrix for the corresponding subscribers to be successively selected. As each row is selected, its meter pulse total is read out, increased by one if an incoming meter pulse is present, and then re-recorded in the row from which it was read out. After this, the next row of the line matrix is selected for examination in the normal way.

This arrangement allows the scanning cycle to be of considerable shorter duration than would be the case if a complete scan, including the selection and individual examination of every subscriber's line, was performed. Thus all 10 lines of a group whose line cores are in the same row of the line matrix are dealt with in one time position if that group has no meter pulses to be dealt with, and also if only the first line of the group has a meter pulse to be dealth with. Hence the average duration of a scanning cycle is shorter than would otherwise be the case. This would allow the same equipment to handle meter pulses occurring at a higher rate, or to serve a larger number of subscriber's lines.

The equipment may also include facilities for read-out for accounting purposes, protection against multiple response to a meter pulse due to a split pulse and a check when the stored pulse total exceeds capacity. Since these functions do not form part of the present invention these parts of the equipment will not be described.

Turning now to a more detailed consideration of the operation of the equipment, the repetitive operation rate of the system is determined by two clock pulse trains *t*1 and *t*2, having the same pulse repetition frequency but phase-displcaed so that a pulse in train *t*1 occurs midway between successive pulses in train *t*2. Pulses in train *t*1 control the stepping of three decade counters 1C, 2C and 3C employed in scanning the line store FS.

Discrimination between conditions requiring group and line scanning respectively is effected by a two-unit pilot trigger PT. This trigger normally rests with its unit PT0 operated.

Counter 3C normally rests with its unit 3C1 operated. (Reset means (not shown) can be provided to ensure that when the equipment is initially switched on, PT0 and 3C1 are operated, such means being well-known.) Since 3C1 and PT0 are operated, pulses reach counter 2C via gate 1G1, so that this counter steps through its cycle. When its output 2C10 is energised counter 1C is stepped once by a pulse via gate 1G2.

The line matric FS consists, as already indicated, of a co-ordinate matrix of ferro-magnetic cores, one per line served. In the present case it is assumed that the equipment serves a block of 1000 lines, and the matrix FS therefore consists of 1000 cores arranged in 100 rows each of 10 cores. When a meter pulse due to a call by one of the subscribers served occurs, this pulse is applied from that subscriber's line circuit over a wire such as MW, and it sets that subscriber's core from its normal to its operated condition.

The line matrix access switch AS1 consists of a co-ordinate array of 10×10 individual cores each having an output winding connected to a row wire of the matrix FS. The access switch AS1 is controlled by the outputs from the two counters 1C and 2C, via the amplifiers indicated in FIG. 1. When a stage of 1C is operated, a pulse is applied to a row wire of AS1, which sets all the cores in that row to their operated conditions; these cores are then successively reset by the outputs from the stages of counter 2C, each applied to one of the column wires of AS1. The output from a core of AS1 on this reset forms the select condition for a row of FS. (Any output due to the initial setting of these cores is disabled in a known manner.) This select condition occurs midway between a *t*1 pulse and a *t*2 pulse. Thus the access switch AS1 sequentially selects the row of FS, applying a read pulse to each row wire in turn.

When a read pulse is applied to a row of FS, it resets any cores in that row which were set before it occurred. (A read pulse is inffective on a core on the input winding of which a meter pulse is present, this provision ensuring that a meter pulse cannot be recorded twice however long it lasts.) If a core is reset by the read pulse, an output is produced on its column wire, which, via amplifiers (not shown) sets the apropriate one of the column triggers CT1 to CT10.

The outputs from column triggers CT1 to CT10 are applied via a gating array to the adder A. This is a binary-coded-decimal adder for parallel operation which is arranged to receive a number from the main store MS and to add one unit to it when required.

It is necessary now to consider the main store MS. This is a co-ordinate array of ferro-magnetic elements, having 1000 rows one of each subscriber's lines served. Each row can accommodate a five-digit decimal number in binary-coded decimal notation, and the 20 columns needed for this are shown schematically in FIG. 2. Other columns and associated circuitry for the functions mentioned briefly in the introductory description are not shown or described as they form no part of the present invention.

The main store MS is controlled by a further access switch AS2, comprising a 10×100 core matrix, whose operation differs from that of AS1 since it has to provide for both reading from a row of MS and re-writing into the same row. In addition to the row and column wires, and the individual cores' output windings, the access switch AS2 has a common bias wire connected to a winding on every one of its cores. This caries a bias such that each core is carried well into the region of negative saturation. Each row or column's circuit of AS2, although shown as an amplifier, is a pulse-controlled circuit which when its input is energised applies a pulse to its row or column wire at each reading time, i.e., between *t*1 and *t*2. Thus in the normal condition at each successive reading time the first column receives a pulse because its input is energised from 3C1.

Each coincidence of an energised output from 1C and an energised output from 2C opens a gate such as 2G1 (for the 1C1–2C1 coincidence), and this via its control circuit, such as CCR, causes a pulse to be applied to the corresponding row wire of AS2. This coincides with a column energisation (normally of the first column) so that the core at the intersection of the energised row and column wires is driven to positive saturation for the duration of the pulses. By suitable proportioning of the windings and associated circuitry the output so produced from the selected core is in the read direction and of sufficient amplitude to reset the operated cores of the row of MS to which it is applied.

When such a read pulse is applied to a row of MS, the cores of that row which are in the operated or "1" conditions are reset to "0" and outputs appear on their column wires. For the elements already at "0" there is at this time little or no output. These outputs set the column circuits CCM, which may be similar to the column circuits CT.

When the coincidence of conditions which caused the selection of a core of AS2 ends, the selected core returns to its normal state. This provides an output, to the row wire of MS, which is arranged to be of half the amplitude of the read pulse and in the opposite direction. At the same time as this half-write pulse is applied to the selected row of MS, similar half-write pulses are applied to the column wires which pass through cores in which "1" is to be written. Hence the word read from the selected row of MS is re-recorded therein, either with or without alteration, as required.

To return to the main description, the two access switches are controlled in synchronism from the counters that when a row of FS is selected, the row of MS containing the word for the first line of the group to which the selected row of FS corresponds is selected.

There are now four possible conditions to consider:

(a) No meter pulses in the selected row.

(b) Meter pulse for the first line of the selected row.

(c) Meter pulse for a line or lines other than the first line of the selected row.

(d) A combination of conditions (b) and (c).

In condition (a), at the time that the row of the matrix FS is read, none of the column triggers CT1 to CT10 are operated. Hence none of the gates such as 1G3 can open *t*2 to control PT. The result of this is that the counters are free to step on at the next *t*1 pulse to cause the selection of the next row of FS via AS1, and via AS2 of the row of MS which corresponds to the first line of that row of FS. In addition to this, none of the gates such as 1G4 opens and hence the adder A receives no input via its left-hand control lead. Therefore when the half-write pulse for the row of MS which has been read out occurs, the word which was read out is re-written into the store. Thus the apparatus has tested a group of lines for the presence of a meter pulse in one time position, has found no meter pulse to be dealt with for those lines, and has therefore moved on to test the next group of lines.

If condition (b) holds, i.e. if only CT1 has been set, then the coincidence of CT1 and 3C1 energised opens gate 1G4, so that the adder receives an input. This causes it to add "1" to the binary coded decimal number which has been read from the selected row of MS. Thus when re-writing occurs an amended word is re-written into MS. Binary-coded decimal adders are well known in the art, and hence no description thereof is considered to be necessary. In this condition, since none of the column triggers CT2 to CT10 are operated, PT is unaffected, and on the next *t*1 pulse, the next group of lines is tested. Thus in the case, a group of lines has been tested in one time position and a meter pulse to be dealt with found for the first line of the group only, this meter pulse has been added to the corresponding line's total, and the equipment has moved on to test the next group of lines. Hence the response to the meter pulse for this line does not increase the duration of the operational cycle.

In condition (c), one or more of column triggers CT2 to CT10 is set, and so one of the gates such as 1G3 is opened at *t*2 to set the trigger PT from PT0 to PT1. The result of this is that gate 1G1 is closed, so holding 2C in its operated condition. At the same time, gate 1G2 is closed because PT0 is no longer operated. Also gate 1G5 is opened so that 3C is stepped in response to the pulses *t*1. The result of this is that on each such step the recorded word in MS for a line of the group being dealt with is read from MS into the column circuits CCM. Since the gates such as 1G4 are also controlled from 3C, the conditions of the column triggers CT2–10 are offered successively to the adder A, each at the time at which the corresponding word has been read into CCM. Hence each meter pulse which has been read from FS into CT causes the addition of unity to the corresponding total in MS. After the reading into CCM, each word is re-written into its row of MS.

When counter 3C reaches 3C10, the word of MS which corresponds to the triple coincidence of 3C10 and the instantaneous settings of 1C and 2C is read out and subsequently re-written either modified or not, dependent on the state of CT10. In addition, the next *t*1 pulse causes PT to be reset to PT0 operated, via gate 1G6, and also steps 2C to its next position via 1G7. The same *t*1 pulse finds PT at PT1 and so 3C returns to 3C1. Hence the circuit has now been driven to the conditon for selecting the next row of FS for testing, with PT in its normal condition.

Thus the group of lines has been tested in one time position, a meter pulse to be dealt with for one or more of the lines of that group other than the first has been detected, each such meter pulse has been dealt with in a scan of all lines of the group, and normal operation resumed.

Condition (d), i.e. CT1 set and one or more of CT2–CT10 set when a row FS is read causes the operations described under condition (b) together with those described under condition (c), and no further description thereof is necessary.

The arrangements for reading out the contents of MS for accounting purposes are not shown, other than schematically by gate 2G2 and the block labelled "output equipment." When read out is required the output equipment causes a set of gates corresponding to 2G2 to open so that the words MS are read off at a rate appropriate to the output equipment. This rate may vary, dependent on the nature of the output equipment. The output equipment includes control means which ensures that read-out of the words is effected one after the other. In addition means is provided for reading out a desired word, or a desired group of words. The latter could be the group of recorded words for the lines of a P.B.X group, whose lines need not necessarily be consecutively numbered.

In any case, the read-out can be done in such a way as to cancel the recorded word because normal read-out from the main store MS destroys the stored record. If a meter pulse is being dealt with when a line's word is selected for read-out, then the read-out is disabled until after the meter pulse has been dealt with.

While the principles of the invention have been described above in connection with specific embodiments, and particular modification therof, it is to be clearly understood that this description is made only by way of example and not as a limitation on the scope of the invention.

What we claim is:

1. Electrical data processing equipment including a data storage device comprising a plurality of storage elements arranged in groups with each group consisting of two or more elements, means for storing data information in any of said elements, said information being stored at time of occurrence on a random time base, first scanning means for successively scanning the said elements group by group to detect the storage of data information in predetermined ones of said elements in each group and to provide an output indication thereof, second scanning means, means for operating said second scanning means responsive to each said output indication to scan the said predetermined ones of said elements in the corresponding group to gain access to data information stored therein, wherein the said predetermined ones of said elements in each group include all elements in a group except one and wherein the first scanning means scans the said one element to gain access to the data information therein concurrently with the said scanning of the elements group by group to detect the storage of data information, a second storage device providing the same number of storage addresses as there are storage elements in the first-mentioned storage device, access means, and means for controlling said access means in synchronism with the first and second scanning means to modify data stored in the corresponding addresses of the second storage device in accordance with data stored in any element of the first storage device to which access is at any instance afforded.

2. Data processing equipment according to claim 1, wherein the first storage device provides an intermediate store for impulses received from a corresponding plurality of individual sources, and wherein the second storage device stores at each address therein the total number of impulses received from the corresponding individual source.

3. Data processing equipment according to claim 2, wherein the storage elements of the first storage device are bi-stable devices arranged in a co-ordinate array each row of which constitutes a group of storage elements.

4. Data processing equipment according to claim 3, wherein the second storage device comprises a plurality of bi-stable storage elements arranged in a co-ordinate array, each row of which constitutes an address of the device.

References Cited by the Examiner

UNITED STATES PATENTS

| | | | |
|---|---|---|---|
| 2,885,659 | 5/1959 | Spielberg | 340—172.5 |
| 2,991,454 | 7/1961 | Hammer | 340—172.5 |
| 3,021,511 | 2/1962 | Vinal | 340—172.5 |
| 3,037,193 | 5/1962 | Barbagallo et al. | 340—172.5 |
| 3,042,901 | 7/1962 | Dirks | 340—172.5 |
| 3,046,528 | 7/1962 | Rowe et al. | 340—172.5 |
| 3,056,110 | 9/1962 | Cypser et al. | 340—172.5 |

ROBERT C. BAILEY, *Primary Examiner.*

L. MILLER ANDRUS, MALCOLM A. MORRISON, *Examiners.*